P. H. J.-B. M. CHASTENET DE GÉRY.
CORD FOR SURGICAL LIGATURES AND OTHER PURPOSES
APPLICATION FILED MAY 1, 1908.
977,383. Patented Nov. 29, 1910.
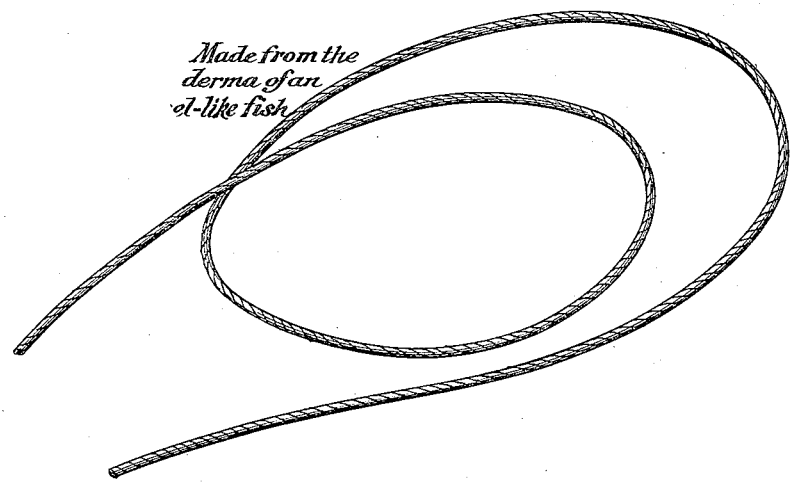

UNITED STATES PATENT OFFICE.

PAUL HENRI JEAN-BAPTISTE MARIE CHASTENET DE GÉRY, OF NANTES, FRANCE.

CORD FOR SURGICAL LIGATURES AND OTHER PURPOSES.

977,383.  Specification of Letters Patent.  Patented Nov. 29, 1910.

Application filed May 1, 1908. Serial No. 430,425.

*To all whom it may concern:*

Be it known that I, PAUL HENRI JEAN-BAPTISTE MARIE CHASTENET DE GÉRY, a citizen of the Republic of France, and resident of Nantes, France, have invented new and useful Cords for Surgical Ligatures and other Purposes, which invention is fully set forth in the following specification.

This invention relates to processes for making cords of fish-skins and to an improved product consisting of a fish-skin cord; and the object of the invention is to provide an improved cord such as may be used for surgical purposes and have great advantages over those heretofore used.

The surgical use of gut-cords has experienced various vicissitudes because catgut, like all surgical threads, must be aseptic, that is to say, absolutely free from germs or microbes, and it is extremely difficult, not to say, impossible, to sterilize gut-cords in an absolutely reliable manner, the same being prepared from a substance which is, as an intestine, originally very unclean and fragile and which does not well resist the action of heat, like all organic substances. Gut-cords are, therefore, very imperfect from certain points of view. Other threads that can be absorbed and which have been suggested for replacing gut-cords, have been practically all abandoned, owing to various serious disadvantages.

The invention as stated relates to cords of fish-skins which have all the desirable qualities of gut-cords without having their disadvantages, at least from the surgical point of view. These cords have in fact suppleness, strength and regularity of gage, They are perfectly absorbable within a suitable period, and owing to their origin, they are very easy to sterilize.

The accompanying drawing shows in perspective a fish-skin cord of the kind provided by my invention.

The skins of mammals, owing to their membraneous form and to their frequently very large dimensions, are naturally suitable for manufacturing threads and cords, but they generally contain a horny substance which, while giving the strength on account of which the skins are used for so many purposes, is by no means absorbable into the tissues of living organism, when such threads or cords are used for surgical purposes. Furthermore, the skins of mammals being very rich in glands are full of germs, which are very difficult to remove and the presence of which constitutes a very serious disadvantage in surgery. Of all the vertebrate animals only fish have no horny substance in their skin and hardly ever any real cutaneous glands. They live in water which protects them against dirt of many kinds. Some fish have scales—bony, ivory-like productions of the dermis—which, without doubt, are not absorbable. For this reason threads or cords prepared from the skin of such fish cannot in their unprepared state be used for the purposes of this invention. However the skins of certain fish, of the genus silurus and lamprey, are more adaptable to the preparation as proposed by this invention than the skins of other fish are.

It is certain that the fish whose skins seem to be the most suitable for the manufacture of cord forming the subject of this invention, are those which we call eel-like, that is to say, the body of which is very long and cylindrical. In these fish, the length is very great relatively to the total bulk. This constitutes an advantage for the manufacture of threads or strands as will be readily understood. Moreover, and this is much more important, the skin of these fish, because of their incessant movements and changes of form, while living, is made of a special tissue which is very elastic, and which readily expands or contracts. It is the presence of this tissue which gives the cords made from the skin of eel-like fish all the desirable features required. The eel, the conger, the muraena, the lamprey and generally eel-like fish are, therefore, the best fish for the purpose of this invention. The eel has microscopic scales, but it is well known that they can be dissolved by immersing the skin in, for instance, a solution of picric acid. The skin of the conger is completely bare, thick and strong. It is perhaps the best for this purpose. The lamprey has also a bare skin, but less strong.

If the skins removed from the fish are examined microscopically, it is found that they have varying thicknesses, but all of them are sufficiently dense and fairly loosely connected to the underlying tissues so that they can be easily removed without injury. The color is usually dark at the back and light at the stomach. The outside of the skin is slippery owing to the mucous and greasy coating. Inside, it sometimes has adhering filaments which come from the layer of conjunctive tissue at which the division has to be effected. Microscopically, these skins appear to be constituted chiefly of two layers; a thick epidermis constituted by pavimentous epithelial cells and some mucous cells, and a derma extremely rich in undulated conjunctive bundles. When there are any scales, as in the case of eels, they are at the surface of the derma, and are covered by the epidermis. In view of this structure it is necessary to so treat these skins, as by cleaning and scraping, as to free them of any foreign substances which might be injurious when brought in contact with sensitive wounds.

Generally speaking, it is necessary first to clean and scrape the skins, secondly to spin them into cords, that is to say, to divide them into strips or threads and twist the said strips, if desired, and thirdly to polish the cords or strips. Finally for using them it will be necessary to sterilize them. The various steps may be described as follows:

1. For cleaning the skins, they can be scraped and immersed in soda or potash lye, for a variable time. The skins of the conger and the lamprey are, for instance, more difficult to clean from their mucous than those of the eel. Afterward they are rinsed and washed in clear water. Then the skin can be scraped, so as to equalize the inner surface which has filaments of cellular tissue. It is difficult to remove by scraping the pigmented epidermic layer and to keep only the useful derma. This, however, may be effected by alternately using baths and scraping. If desired, the skin may be bleached or decolorized at this time by means of some chemical agent such as sulfurous acid or oxygenated water, or this operation could be effected subsequently.

2. The spinning, or, in other words, the conversion of skins into threads, usually requires the division of the skin into more or less fine strips, according to the thickness of the skin and to the thickness of the thread to be obtained, and afterward as an additional operation the twisting of the said strips or laces. The division of the skin into strips can be effected in various ways, but in order that the strips shall be regular, it is necessary to fix the skin flat on a strong support, and to act on it with a sharp instrument, such as a razor or cutting roller which is caused to move in a straight line, by means of some guide. It has been stated that the twisting is not always necessary because some threads obtained by the simple division of thick skins, such as, for instance, the skin of the conger, can be utilized without twisting, if it is preferred to have a flat thread, or a thread of square cross-section rather than cylindrical thread. But in practice, some think the twisting is generally indispensable in most cases in order to give to the threads the uniformity which renders them more easy to manipulate. This twisting may be effected by means of frames or spinning wheels. The decolorizing of the cords if not previously effected, could be effected at this point.

3. The cords or strips being held on the machine, it will be necessary in order to finish them and to render them uniform, to submit them to the important operation of polishing. This consists in causing them to pass between horse-hair rubbing devices and then between rubbing devices or grinders provided with pumice stone powder. When after these various manipulations, the cord or strip is perfectly dry, it may be removed and after which it is ready for use.

A cord which is produced by this method and which is a cord made of fish-skin, can be submitted to any sterilizing process by chemicals or by heat, such as is usual for this purpose. The important point is that the fish-skin, not being originally as infected as the sheep intestine of which catgut is made, the cord made therefrom can be easily sterilized, unlike catgut, which is responsible for many accidents, and the chemical processes which have been abandoned as regards catgut, could be advantageously used for the sterilization of cords made of fish-skin as proposed by my invention.

My invention therefore consists of a new article of manufacture composed of a fish-skin cord, thread or strip which by reason of its being readily absorbed by living tissues, is especially adapted for use in surgical sutures and for analogous purposes, and which is made from fish-skin by slitting or dividing it into filaments or fibers suitable for the object intended after non-absorbable parts of the fish-skin have been removed, and more especially of a cord or strip made of the skin of the fish of the eel-family prepared so as to be absorbable into the tissues of living organism, and obtained by removing the epidermis and slitting the so prepared skin into strips.

Having thus described my invention, I claim as new and desire to secure by Letters Patent:

1. As an article of manufacture, a fish-skin thread, string or cord which by reason of its being readily absorbable by living tissue is especially adapted for use in surgical sutures and for other analogous purposes, and which is made from fish-skin by slitting or dividing the skin into filaments or fibers suitable for the object intended free from non-absorbable parts of the fish-skin.

2. As a new article of manufacture, a cord absorbable into the tissues of living organism, obtained by removing the epidermis and slitting into strips, a skin of the fish of the eel-family.

3. As an article of manufacture, a cord made of the derma of fish-skin from which the epidermis has been removed, the derma being free from glands, so as to be absorbable into the tissues of living organism.

4. As an article of manufacture, a cord made of the derma of the skin of fish of the eel-like family, free from glands, so as to be absorbable into the tissues of living organism, and polished.

5. The process herein described, which consists in bathing a skin of the fish of the eel family in a cleaning solution for a suitable period, washing the skin in clear water, scraping the skin to such an extent on both the inner and outer surfaces as to free it of the epidermis and every part except the derma, and enable it to be absorbed into the tissues of living organism, dividing the skin into strips, and polishing the strips.

6. As an article of manufacture, a cord made only of the derma of the skin of fish of the eel-like family, free from glands and scales, and polished.

In testimony, that I claim the foregoing as my invention, I have signed my name in presence of two subscribing witnesses.

PAUL HENRI JEAN-BAPTISTE
     MARIE CHASTENET DE GÉRY.

Witnesses:
  LOUIS GOLDSCHMID,
  R. J. CHANYEAU.